May 1, 1956    H. LEVINSON ET AL    2,743,800
MAGNETIC FLUID CLUTCH WITH COOLING MEANS
Filed Nov. 18, 1950

INVENTOR.
HARRY LEVINSON
GEORGE H. STONER
EDWARD N. TANGEN
BY
Reynolds, Beach & Christensen
ATTORNEYS

United States Patent Office 2,743,800
Patented May 1, 1956

2,743,800

MAGNETIC FLUID CLUTCH WITH COOLING MEANS

Harry Levinson, George H. Stoner, and Edward N. Tangen, Seattle, Wash., assignors to Boeing Airplane Company, Seattle, Wash., a corporation of Delaware Application November 18, 1950, Serial No. 196,502

16 Claims. (Cl. 192—21.5)

This invention relates to improvements in magnetic fluid clutches generally of the type disclosed in Technical News Bulletin, volume 32, No. 5, May 1948, U. S. Bureau of Standards, in an article entitled "Magnetic Fluid Clutch." The invention is herein illustratively described by reference to the preferred form thereof which is especially adapted for servomechanism control applications; however, it will be understood that the same may be used elsewhere and that certain modifications therein may be made for other applications without departing from essential features comprising the invention.

As explained in the above-cited publication, the magnetic fluid employed in the clutch comprises a large proportion of magnetic particles, such as iron dust, suspended in oil or a similar viscous fluid. When a magnetic field is passed between coacting clutch plate surfaces and such magnetic fluid contained therebetween a magnetic stress is set up in the fluid which causes temporary rigidification thereof, which couples the clutch plates together for transfer of torque therebetween to a degree dependent on the magnetic field intensity. When the magnetic field is removed the magnetic fluid returns to its normal viscous fluid state and the rotor elements are effectively decoupled. Coupling and decoupling of the clutch plates is readily controlled, therefore, by energizing and deenergizing of a magnetic field winding appropriately incorporated in the clutch structure.

Some of the obtainable advantages adapting a perfected clutch of this type for various applications include the absence of mechanical wear of the clutching surfaces, the simplicity and ease of control, the large torque transfer capacity of the clutch practically independently of speed or load, the inherently smooth torque transfer operation under all conditions, reliability, and the large power amplification obtainable. Additional obtainable characteristics are hereinafter set forth or will appear.

There have been important problems, however, connected with the implementation of the magnetic field clutch principle for practical application. Among these are the overcoming of mechanical and electro-magnetic inertia or delay in the response of the clutch to control impetus, the obtaining of compactness yet high torque capacity, the extraction and removal of relatively large quantities of heat generated by friction or viscous drag of the magnetic fluid when the driving rotor is rotated continuously at very high speeds relative to the driven rotor, and others.

A particular object of the present invention is a compact magnetic fluid clutch capable of high-torque transfer operation yet adapted for efficient cooling.

Another object is such a magnetic fluid clutch additionally capable of responding rapidly in terms of changed degree of coupling between rotors pursuant to changes in control voltage applied to the magnetic field coil. More specifically, it is an object to minimize mechanical inertia of the driven or output rotor, and also to minimize the so-called "secondary shorted-turn" delay effect normally encountered in electro-magnetic circuits. The present invention virtually eliminates objectionable circulating current in conduction paths linked with the magnetic field, that is "shorted-turn" induced currents which produce counter-induced voltages in the magnetic field coil and thereby oppose rapid changes in magnetic field strength. Of special significance however is the minimizing of the shorted-turn effect by a special rotor construction which avoids all necessity for slots or equivalent current barriers in the critical rotor parts, hence makes possible a lightweight yet rigid rotor construction permitting accurate bearing alignment and maintenance of short air gap clearance around the rotor. Moreover, it avoids the need of insulating slot seals to hold the magnetic fluid within the inter-rotor fluid chamber. Organic insulations are not well suited for the high temperatures present in magnetic fluid clutches of this type, hence avoiding slots requiring seals is desirable.

Still another object is a high torque capacity magnetic fluid clutch utilizing the available magnetomotive force of the clutch winding to produce maximum control stress in the magnetic fluid, and applying such stress to active clutch surfaces located at maximum torque-producing radius for a given low output-rotor inertia and over-all clutch diameter and length.

Further objects include manufacturing simplicity, and ease of assembling and dismantling of the clutch for maintenance, inspection or repairs.

In its preferred and herein illustrated form the improved magnetic fluid clutch, in brief outline, employs a stationary magnetic field coil structure encircling concentrically arranged input and output rotors, and producing a coaxial magnetic field which enters the inter-rotor magnetic fluid chamber radially and endwise through rotor end structure separated from surrounding field structure poles by radially short annular air gaps. The outer rotor body comprises a continuous outer or backing collar of nonmagnetic material, an inner sleeve of similar material fitting therein, and a series of inside rings, constituting clutch plates, of ferro-magnetic material, integrally bonded to the internal cylindrical wall of such sleeve at intervals along its length. The inner rotor body, likewise of nonmagnetic material, is preferably of tubular construction for internal cooling thereof, and carries encircling ferromagnetic rings thereon which project radially outward into the spaces between the clutch plate rings carried by the outer rotor, in interleaved coacting clutch relationship therewith.

For assemblage purposes the ring-carrying sleeve of the outer rotor is of segmented construction, whereby the segments may be assembled around the inner rotor with the respective sets of clutch rings interleaved. The sleeve segments are then retained fixedly in the desired concentric relationship with the inner rotor and also in forced heat exchange contact with the encircling collar by outward wedging action produced by special end retainer elements cooperating with conically formed end surfaces of such segments and bearing axially thereon.

Preferably the interfitting collar and sleeve portions comprising the body of the outer rotor assembly linked by the magnetic field are both of stainless steel or similar nonmagnetic metal, having adequate heat conductivity for clutch cooling purposes, as herein described, but possessed of poor electrical conductivity relative to the conductivity of copper or brass, for example. Consequently, negligible shorted-turn circulating current occurs in such outer rotor body, hence inappreciable delay in the response of the clutch control system to energization thereof. Because this result is obtainable without need for slotting such outer rotor body assembly, the same can be of very rigid, yet lightweight construction.

Preferably the inner rotor body portion is of a material such as copper, having high heat conductivity, and nonmagnetic. Then because the ferromagnetic clutch plates are supported by and between nonmagnetic metal rotor body elements, the magnetic flux produced by the field coil is largely confined in the generally cylindrical inner path through the series of interleaved magnetic rings and interposed magnetic fluid, so that stray or nonuseful magnetic flux is a minimum. Since very little of the total flux links the copper body portion of the inner rotor, the high electrical conductivity of the copper adds negligibly to the shorted-turn effect but its heat conductivity is an important cooling factor.

During continuous operation of the clutch at a high rate of slip between rotors, the heat generated in the magnetic fluid chamber and extracted by the magnetic rings and nonmagnetic rotor body portions supporting the same, is rapidly conducted inward and outward by such heat-conductive body portions, respectively, to exposed surfaces thereof, past which coolant is circulated. A spiral cooling duct formation upon the outer collar adjacent to the coil structure is so arranged that it enables removal of heat from both the outer rotor and such coil structure without necessitating objectionable widening of the annular air gaps at the stator poles. Heat extracted by the inner rotor structure is removed by a spiral duct of large heat exchange area extending axially therethrough. Maximum heat transferability from the ferromagnetic rings or plates of the clutch to their respective supporting rotor body elements is effected by brazing or similar bonding between the same, and also by forced contact between outer rotor collar and sleeve segments.

The foregoing and other features, objects and advantages of the invention, including certain details of construction pertaining to the herein illustrated form thereof will now become more fully evident from the following detailed description based upon the accompanying drawings.

The terms "ferromagnetic," "paramagnetic" and even "magnetic" as herein applied to materials or parts and intended to connote the presence of a magnetic permeability materially greater than unity and are not intended to denote any particular degree of permeability. Obviously design considerations well known to those skilled in the art will dictate, for particular applications, the degree of permeability required for best results in each instance or phase of engineering design and in many instances may be open to considerably variation. The term "nonmagnetic" as herein used also includes the meanings of "diamagnetic" where applicable or suitable.

Figure 1:
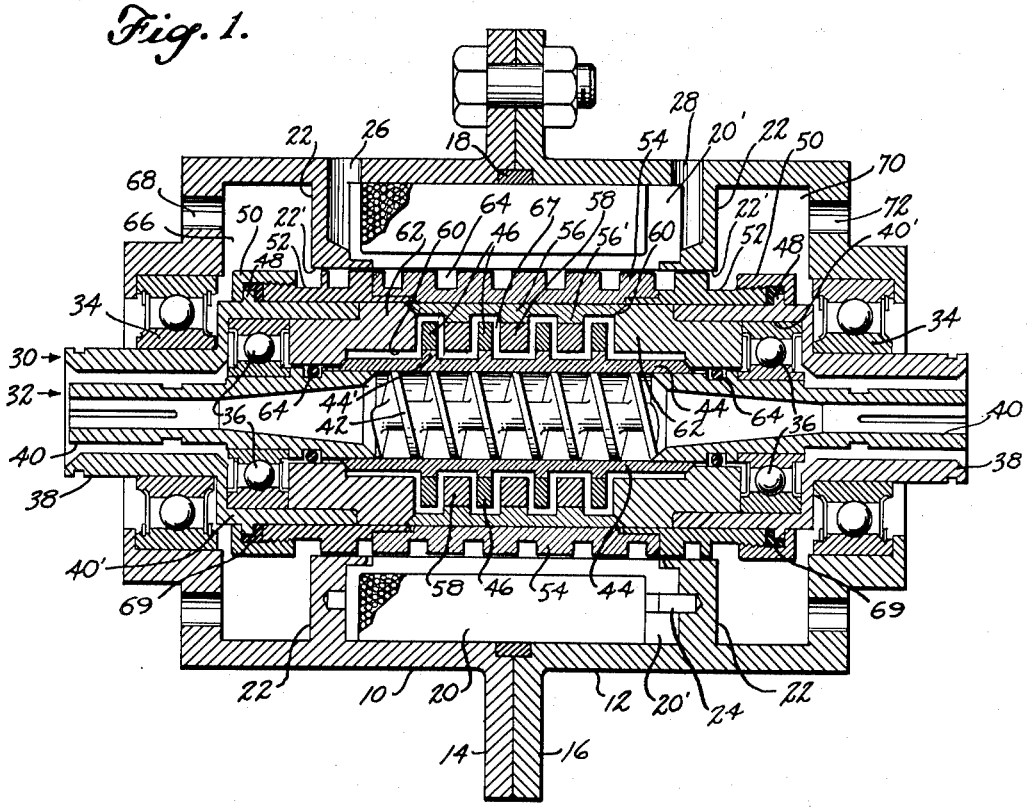
Figure 1 is a longitudinal sectional view along the central axis of the clutch.

The clutch housing is formed in two generally cylindrical half-portions 10 and 12 having mounting flanges 14 and 16 by which they are bolted together and by which the clutch as a whole may be suitably mounted in its installation surroundings. A locating ring 18 and complemental receiving groove portions in the adjoining inner corners of the two housing portions insures accurate alignment of such portions when bolted together.

The magnetic field coil 20 extends as an internal band around the mid-portion of the assembled housing between inwardly projecting annular flanges 22, one on each housing section. As will later appear such flanges in effect serve as opposite poles of the magnetic field structure associated with the coil 20. The entire housing, including the flanges 22, is preferably of steel (such as 1020 S. A. E. steel) or other suitable ferromagnetic material. Doweling 24 interengaged in aligned sockets in adjacent end faces of the coil jacket 20' and housing flanges 22 locates and maintains the coil in fixed position relative to the housing. The two radial bores 26 and 28 in the respective housing sections 10 and 12 provide openings for admitting coil-energizing conductors (not shown).

The interior cylindrical wall of coil 20 is approximately flush with the inner or pole faces 22' of the flanges 22, the rotor assemblage being rotatively mounted therewithin. Preferably the output rotor 30 encircles the input rotor 32, and the former is journaled by ball bearings 34 from the restricted open ends of the housing, while the latter is journaled by ball bearings 36 from the outer rotor interior, as in the manner illustrated. Neoprene sealed bearings are preferred in both instances. In the case shown the outer rotor is provided with projecting tubular output coupling shafts 38 at both ends of the clutch, and the input rotor with concentric input coupling shafts 40 also projecting at both ends of the clutch. The shafts 38 are tubular to receive the shafts 40 and the latter are tubular for passage of cooling fluid axially through the inner rotor. A nonmagnetic spiral screw-like element 42 is received centrally within the enlarged hollow interior of the inner rotor to define a spiral cooling duct through the same in communication with the end-opening passages through the tubular shafts 40.

The hollow coupling shafts, suitably splined or otherwise adapted for external driving connections, are preferably of steel and the respective inner end portions of shafts 40 are rigidly interconnected by the inner rotor hollow cylindrical body portion 44 receiving spiral cooling duct element 42. This rotor body portion is of a nonmagnetic material such as copper or brass, having high heat conductivity. Upon its outer surface are formed annular ribs 44' at spaced locations along its length, and upon these ribs are brazed the encircling magnetic rings or clutch plate elements 46 of radial disk form. By the term "brazed" is meant to include the usual brazing processes or any equivalent metal-bonding process including welding. In constructing the inner clutch rotor it is preferred that the magnetic rings 46 and nonmagnetic ring-supporting body portion 44 be formed by first inserting a copper tube within a moderately close fitting steel tube, with brazing metal interposed therebetween. When such an assemblage is heated, as by the conventional magnetic induction heating technique, the parts become bonded together permanently. The tubular body member 44 is similarly brazed to the inner ends of the input coupling shafts 40. By a similar technique the spiral duct-forming element 42 may be bonded to the inner wall of the tubular body member 44 to complete an integral rotor structure. Thereafter in a simple machining operation the steel tube mentioned is cut away between the desired clutch rings 46, as are portions of the copper tube to form projecting ribs 44'. Any other desired external machining operations are also done at that time.

The outer rotor structure 30 is not formed as a unitary assemblage, but in parts and sections permitting assembly and dismantling of such rotor which surrounds the inner rotor. When assembled together, however, the two rotors constitute a unitary rotor structure which can be placed in and taken from either half-section, 10 or 12, of the clutch housing, when the other section is removed.

The tubular output coupling shafts 38 have flanged or bell-shaped inner end portions 40' which receive the ball bearings 36, by which the inner rotor is journaled within the outer rotor structure. An annular rib 48 extends around the exterior of each such bell-shaped portion 40' and constitutes an abutment shoulder engageable by the flange of a threaded cap 50. The cap threads cooperate with threads formed upon the respective opposite end portions of outer rotor collar element extensions 52. The latter, of ferromagnetic material, are brazed or otherwise suitably bonded to the respective ends of nonmagnetic collar portion 54, as opposite end extensions thereof. By progressively rotating the threaded caps 50 upon the ends of extensions 52 the bell-ended output coupling shafts 38 are then drawn toward each other and the several parts are held together.

The collar portion 54 is approximately coextensive with the length of coil 20, within which it is received, and is of an outer diameter slightly less than the internal diameter of the coil unit, as shown. Preferably such collar portion is of stainless steel (18–8, proportion of nickel to chromium), although other nonmagnetic metals having the desired general properties may be used. In this case such properties include relatively high electrical resistivity, and suitability for brazing thereof to connected steel parts such as the extensions 52. The collar portion 54 constitutes part of the outer rotor body, as that term is herein used.

Received complementally within the outer rotor nonmagnetic collar portion 54 is an inner sleeve 56 of a similar nonmagnetic material, which sleeve carries inwardly projecting annular ferromagnetic rings 58 disposed in interleaved relationship with and coaxially aligned with relation to, the coacting ferromagnetic rings 46 carried by the inner rotor. The ferromagnetic rings 58 are brazed to annular ribs 56' upon the interior of the sleeve 56 and the sleeve structure as a whole is preferably formed, by a brazing and machining process similar to that described in connection with the inner rotor body element 44 and rings 46. A magnetic-fluid-occupied space between rings of about .05" width is suitable, although some variation is permissible.

Figure 3:
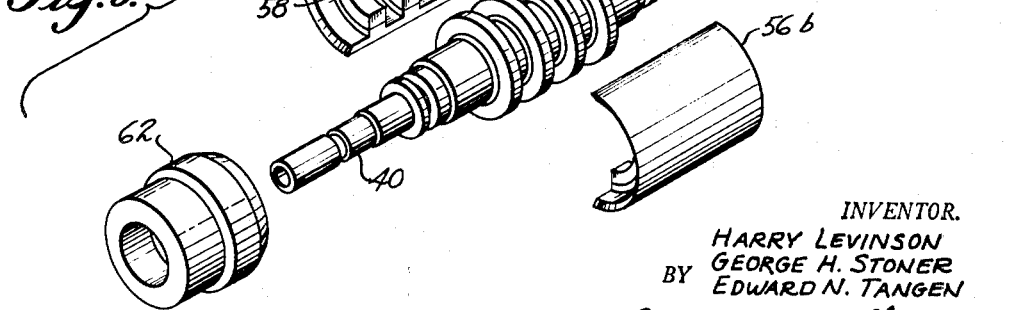
Figure 3 is an exploded perspective view of certain portions of both rotors to illustrate the arrangement for assembling the ring-carrying sleeve segments, in proper relation of the inner rotor and the outer rotor collar portion.

As shown in Figure 3, the ring-carrying sleeve 56 is made up of segments, two such segments, 56a and 56b being employed in the illustrated case. This segmental construction permits assembling such sleeve about the inner rotor structure with the ferromagnetic rings interleaved and coaxially aligned. Inwardly tapered conical surfaces 60 on opposite ends of the sleeve 56 are engaged by corresponding conical surfaces upon the adjoining inner ends of annular magnetic end retainer elements 62. The latter seat against the respective outer bearing races of bearings 36 so that when the threaded caps 50 are tightened against the abutment ribs 48 to draw the shafts 38 toward each other axial pressure is exerted by the end retainer elements 52 inwardly against the conical surfaces 60 of the sleeve segments 56a and 56b. Such axial pressure wedges the sleeve segments radially outward and forces them tightly against the interior wall of the outer collar 54. As a result the latter becomes practically an integral part of the sleeve segments for purposes of heat transfer therebetween and also for purposes of mechanical unification of outer rotor parts, and the sleeve segments are held accurately concentric with other rotor parts.

Rubber O-rings 64 received in annular groves around the inner end portions of the respective input coupling shafts 40 are compressed against the surrounding inner peripheries of the end retainer elements 62 and form a fluid-tight seal between such elements and the respective shafts 40 encircled thereby. The magnetic fluid chamber is formed between these rings, and in the irregular annular space 67 defined between the end retainer elements 62, the rotor body portions 44 and 58, and the ferromagnetic clutch rings 44, 58 supported thereby. Such chamber is filled with magnetic fluid at the time the clutch is assembled by any suitable technique such as the use of filler holes which are plugged upon completion of the filling operation. The magnetic fluid employed is typically a mixture of oil and finely divided iron particles in the respective proportions of about one to six by weight of the ingredients, although some variation is permissible. In the spaces 69 within the retaining caps a mixture of litharge and glycerine is used to effect a seal. Such a paste has been found highly effective for the purpose.

The magnetic path in the clutch extends from each annular pole face 22' radially inward across the short air gap within such pole face to the collar extension element 52 encircled thereby, thence generally radially inward and axially through the solid body of magnetic material comprising the assemblage of extension element 52, bell portion 40' of shaft 40, and the ferromagnetic end retainer element 62, and toward the fluid chamber and series of magnetic rings 46, 58. The flux then passes through the series of interleaved ferromagnetic rings 46, 58 and interposed magnetic fluid.

In cross section a generally toroidal flux pattern is created, the inner or coaxial components of flux within the coil 20 being largely concentrated in the series of magnetic rings 46, 58 and magnetic fluid therebetween as desired. The nonmagnetic property of the annular rotor body portions between which the ferromagnetic rings are supported insures this result. Because the active surfaces of the rings intersected by the flux are of substantial radius the magnetic stress in the fluid produces the desired high torque transfer or coupling capacity between rotors. Any tendency for flux to stray through the ferromagnetic end structure of the inner and outer rotors, hence along the axis of the clutch within the tubular body member 44, is negligible because of the longer magnetic path encountered both in the magnetic material itself and in air gaps and nonmagnetic materials through which such stray flux must travel, spiral element 42 being nonmagnetic.

Figure 2:
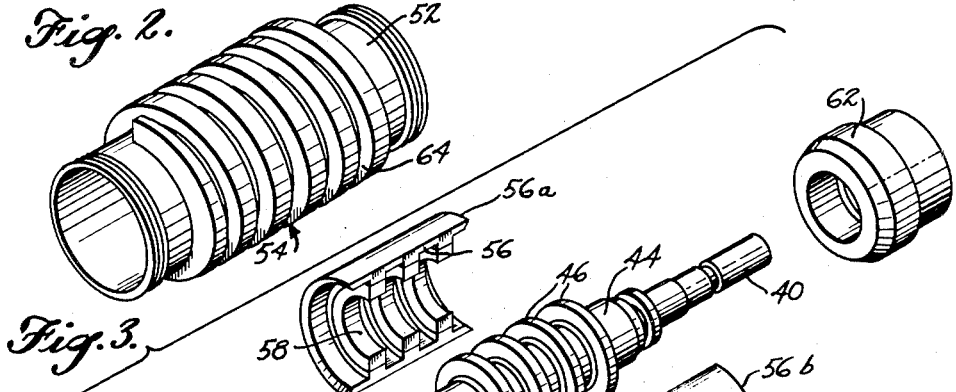
Figure 2 is a perspective view of the composite collar portion of the outer rotor body.

With reference to heat removal from the clutch, the composite outer collar structure 54, 52, as shown in Figure 2, is provided with a helical rib which defines a helical groove or duct 64 around its exterior and extending over the major portion of its length. This groove constitutes a cooling duct through which flows air or other coolant entering the annular cavity 66 at one end of the housing through intake openings 68. Such coolant emerges from duct 64 into a similar annular cavity 70 at the opposite end of the housing and discharges through openings 72. Such duct, being spiral in form, may be relatively deep in the body of collar 54, 52 and yet pass through the short air gap regions within pole faces 22' without objectionably increasing the air gap width traversed by the magnetic field at these locations. However, the retention of a thin continuous air gap between the coil and outer rotor surface is desirable as a heat-insulating barrier for the coil with reference to the heated rotor surface.

Heat generated in the magnetic field coil 20 is thereby removed by flow of coolant in duct 64, and heat generated in the magnetic fluid chamber during high speed slip between clutch rotors is similarly removed. Likewise, heat extracted under these conditions by the inner rotor body portion 44 is removed by flow of coolant through the spiral passage defined by the element 42 within such body portion. Both inner and outer cooling passages in the clutch may be suitably connected to a source of coolant pressure.

We claim as our invention:

1. The magnetic fluid clutch comprising coacting clutch rotors arranged concentrically and each comprising a nonmagnetic rotor body portion of cylindrical form, one such body portion being hollow and the other being received therewithin to define an annular magnetic fluid space therebetween, ferromagnetic clutch plate elements of annular form permanently bonded concentrically upon said nonmagnetic rotor body portions respectively, said ferromagnetic plate elements projecting generally radially from their respective body portions into said magnetic fluid space in overlapping interleaved closely spaced relationship, one of said nonmagnetic cylindrical rotor body portions comprising a nonmagnetic segmented cylindrical sleeve portion adjoining the fluid space and carrying correspondingly segmented clutch plate elements of such rotor, a complemental cylindrical backing portion adapted to bear against the side of said sleeve portion opposite its plate elements, detachable means connected to said backing portion and engaging the ends of said sleeve segments to press the same radially against said cylindrical backing portion, means cooperating with said rotors to contain magnetic fluid in said space between said nonmagnetic body portions and thereby between said ferromagnetic plates, magnetic fluid contained in said space, and magnetic field producing means energizable to set up a magnetic field lengthwise through said magnetic fluid space, hence through said ferromagnetic plates in series, whereby said nonmagnetic rotor body portions tend to deter straying of such field from said space.

2. The magnetic fluid clutch defined in claim 1, wherein the outer cylindrical rotor body portion is segmented and the cylindrical backing portion comprises a continuous nonmagnetic collar encircling the same, such nonmagnetic sleeve and collar both being of low electrical conductivity nonmagnetic metal, and further wherein the magnetic field producing means comprises magnetic field coil means closely encircling said nonmagnetic collar and producing magnetic flux which links said collar and segmental sleeve in passing through the magnetic fluid space.

3. The magnetic fluid clutch defined in claim 2, and further comprising ferromagnetic extensions on the ends of the nonmagnetic backing collar, the magnetic field coil means including annular ferromagnetic end portions having annular inner ferromagnetic pole faces closely encircling said end extensions of the collar to define short radial air gaps therebetween for bridging of magnetic flux radially into and from the outer rotor, and the detachable means engaging the ends of the sleeve segments comprise ferromagnetic end retainer elements fitted within said end extensions, said end retainer elements and the ends of such sleeve engaged thereby having complemental inclined surfaces coacting to effect outward wedging of the sleeve segments by axial advance of said end retainer elements thereagainst, said detachable means further comprising cap means threaded upon said end extensions and adapted to advance said end retainer elements against the ends of said sleeve.

4. The magnetic fluid clutch defined in claim 2, and further comprising ferromagnetic extensions on the ends of the nonmagnetic backing collar, the magnetic field coil means including annular ferromagnetic end portions having annular inner ferromagnetic pole faces closely encircling said end extensions of the collar to define short radial air gaps therebetween for bridging of magnetic flux radially into and from the outer rotor, said collar and end extensions thereof having a spiral cooling duct groove formed in their outer periphery and extending continuously over the length thereof between and past said air gaps.

5. In a magnetic fluid clutch, a rotor member comprising a cylindrical portion of nonmagnetic metal material, and a plurality of ferromagnetic rings brazed upon said cylindrical portion at spaced locations along the length thereof, and a coacting rotor member encircling the first rotor member and comprising a tubular portion of nonmagnetic material, and a plurality of ferromagnetic rings brazed thereon and interleaved with the first-named rings, said tubular portion and rings thereon being of segmented construction.

6. A magnetic fluid clutch comprising coacting clutch rotors arranged concentrically for relative rotation and each comprising a nonmagnetic rotor body portion of cylindrical form, one such body portion being hollow and the other being received therewithin with radial separation therebetween to define an annular magnetic fluid space therebetween, the inner rotor body portion being tubular and defining an internal coolant duct permitting flow of cooling fluid generally endwise therethrough, additional cooling means comprising a rotatively independent stator member closely encircling the outer rotor and having a generally cylindrical surface facing the outer rotor surface, one of said surfaces having a spiral coolant duct extending therearound and progressing lengthwise thereof to permit flow of cooling fluid generally endwise therebetween and in heat exchange relationship therewith.

7. The magnetic fluid clutch defined in claim 6, wherein the tubular inner rotor body portion having the coolant duct therein further includes means extending generally lengthwise therein defining a spiral coolant passage progressing generally along and around the inside periphery of such inner rotor body portion.

8. A magnetic fluid clutch comprising coacting clutch rotors arranged concentrically for relative rotation and each comprising a nonmagnetic rotor body portion of cylindrical form, one such body portion being hollow and the other being received therewithin with radial separation therebetween to define an annular magnetic fluid space therebetween, the inner rotor body portion being tubular and having open ends for admission and discharge of coolant, and spiral duct-forming means of nonmagnetic material received therein and having a spiral rib member contacting the inner wall of said tubular inner body portion, a plurality of ferromagnetic clutch plate elements of radial disk form fixed concentrically upon each of said nonmagnetic rotor body portions, said plate elements projecting radially from their respective body portions into said magnetic fluid space in overlapping, interleaved, closely spaced relationship, means cooperating with said rotors to contain magnetic fluid in said space between said nonmagnetic body portions and thereby between said plates, magnetic fluid contained in said space, and magnetic field producing means energizable to set up a magnetic field lengthwise through said magnetic fluid space, hence through said plates in series, whereby said nonmagnetic rotor body portions tend to deter straying of such field from said space therebetween.

9. In a magnetic fluid clutch, the combination comprising coacting clutch rotors arranged concentrically for relative rotation, each comprising a tubular body portion of heat-conductive nonmagnetic material and one being received within the other to define an annular magnetic-fluid space therebetween containing magnetic fluid, a plurality of ferromagnetic clutch plate rings fixedly carried in alternate mutually interleaved and relatively spaced relationship by the tubular rotor body portions in heat conducting contact therewith, respectively, for relative rotation in the magnetic fluid contained in said space, means to set up a magnetic field extending parallel to the clutch rotational axis, through the magnetic fluid and rings contained in said space, and means for conducting coolant fluid to and from opposite ends respectively of the hollow interior of the tubular body portion of the inner rotor.

10. The combination defined in claim 9, wherein the outer rotor tubular body portion includes a nonmagnetic inner sleeve fixedly carrying at least one clutch plate ring between two similar rings carried by the inner rotor body portion and, with its ring, is formed in arcuate segments, said outer rotor tubular body portion further including a nonmagnetic arcuately nonsegmented holder sleeve encircling and contacting said segmental inner sleeve for holding the segments thereof against relative separation.

11. The combination defined in claim 9, and means encircling and spaced radially from the outer rotor body portion to define a generally annular coolant passage therebetween, and means to conduct coolant to and from said passage.

12. The combination defined in claim 10, and means encircling and spaced radially from the outer rotor body portion to define a generally annular coolant passage therebetween, and means to conduct coolant to and from said passage.

13. The combination defined in claim 11, and means extending along and in heat exchange relationship with the inside periphery of the inner rotor tubular body portion, and further means extending along and in heat exchange relationship with the outside periphery of the outer rotor body portion, forming progressive spiral coolant flow ducts of the respective coolant passages, whereby rotation of the rotors effects progressive motion of coolant through said passages respectively.

14. The combination defined in claim 11, wherein the encircling means last-mentioned comprises annular magnetic field coil means, as the magnetic-field producing means aforesaid.

15. A magnetic fluid clutch comprising coacting clutch rotors arranged concentrically for relative rotation and comprising heat conductive nonmagnetic tubular body portions, respectively, one such rotor being received within the other with radial spacing therebetween constituting a magnetic fluid space, magnetic fluid contained in said space, a plurality of ferromagnetic clutch plate elements of radial disk form fixed concentrically upon each of said tubular body portions, said plate elements projecting therefrom into said magnetic fluid space in overlapping, alternately interleaved, closely spaced relationship, respectively, stationary means surrounding the outer rotor and defining therewith an annular coolant passage immediately adjacent the tubular body portion thereof, the inner rotor tubular body portion having a coolant passage extending lengthwise therethrough immediately adjacent the inside periphery of such latter tubular body portion, and magnetic-field producing means cooperating with said rotors to pass magnetic flux through said magnetic fluid space in a direction parallel to the clutch axis, whereby said nonmagnetic rotor body portions and adjoining coolant passages tend to deter straying of such field from said magnetic fluid space.

16. In a magnetic fluid clutch, a rotor member comprising a cylindrical portion of nonmagnetic metal material, and a plurality of ferromagnetic rings of radial disk form surrounding and joined in heat exchange relationship with said cylindrical portion at spaced locations along the length thereof, and a coacting rotor member encircling the first rotor member and comprising a tubular portion of nonmagnetic material, a plurality of ferromagnetic rings of radial disk form joined in heat exchange relationship with said tubular portion, interleaved with the first-named rings, said tubular portion and rings thereon being of segmented construction, and tubular means surrounding the first rotor member's outer cylindrical portion and spaced radially therefrom to define an annular coolant passage therebetween, and means for conducting coolant to and from said passage and to and from the interior of the tubular portion of the inner rotor, such latter tubular portion having a coolant passage therein to carry such coolant.

References Cited in the file of this patent

UNITED STATES PATENTS

| | | |
|---|---|---|
| 798,156 | Bidwell | Aug. 29, 1905 |
| 1,124,287 | Bulloch | Jan. 12, 1915 |
| 1,803,430 | Hand | May 5, 1931 |
| 1,897,613 | Jensen | Feb. 14, 1933 |
| 2,267,081 | Crighton | Dec. 23, 1941 |
| 2,387,613 | Ryba | Oct. 23, 1945 |
| 2,575,360 | Rabinow | Nov. 20, 1951 |
| 2,671,545 | Petroff | Mar. 9, 1954 |

FOREIGN PATENTS

| | | |
|---|---|---|
| 485,591 | Belgium | Nov. 13, 1948 |

OTHER REFERENCES

Technical Report 1213, National Bureau of Standards, Wash., D. C.

Magneclutch, Vickers Electric Division, Bulletin #6000—1815 Locust Street, St. Louis, Mo. Oct. 19, 1950.